W. R. Anderson.
Fastener for Stair-Rods.
N° 73563. Patented Jan. 21, 1868.
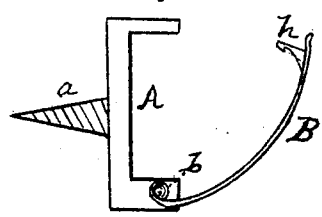
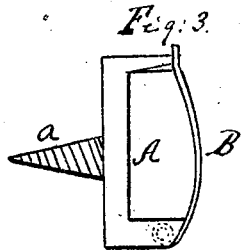
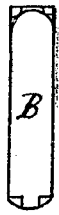
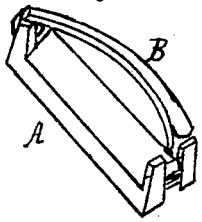
Witnesses — Inventor.
James E. Donovan
William R. Hooley Jr.
Wm. R. Anderson
Per J. D. Gale
his attorney

United States Patent Office.

WILLIAM R. ANDERSON, OF NEW YORK, N. Y.

Letters Patent No. 73,563, dated January 21, 1868; antedated January 8, 1868.

IMPROVED FASTENER FOR STAIR-RODS.

The Schedule referred to in these Letters Patent and making part of the same.

Be it known that I, WILLIAM R. ANDERSON, of the city, county, and State of New York, have invented or discovered certain new and useful Devices for Fastening Stair-Rods and Carpets to Stairs; and I hereby declare that the following is a full and sufficient description thereof, reference being had to the accompanying drawings and descriptive letters marked thereon, and making part of the same.

The nature of the invention consists, in the first place, in so constructing a stair-rod fastening that the whole device shall consist of a single metallic implement or fastening, requiring to fasten it to the stairs no hammer, screw-driver, pliers, screws, or nails, but is in itself a full and complete fastening, adaptable by the human hand to the stairs, independent of all other tools or implements. It is attached to the stairs by a single screw, to the vertical face of the upright part of the stairs or steps, and screwed into its place by means of the human hand, which grasps the implement (the right hand) and screws into its place as one operates the handle of a gimlet. In the accompanying drawings, the Figure I represents a side view of the fastening.

Figure II represents a front view, not in perspective, while the hook is shut down upon the stationary portion.

Figure III, a side view, with the hook closed down.

Figure IV is a perspective view, showing the face of the catch for receiving the hook.

Figure V is the hook, detached.

Letter A represents the stationary part that is screwed into the upright face of the stairs by means of screw $a$. B represents the movable part, which turns on the hinge-pin $b$. $h$ represents the hook on the travelling part of B, to be received into the catch $i$ on the extremity of A.

To use this fastening, the stairs being of wood, (no gimlet will be necessary,) the fastening-screw is screwed into its place with the hand. The hook is detached from its catch by a slight pressure on the top of the arch, which throws the hook outward and detaches it from the catch, and at the same time the hook is lifted out from its fastening and swung out on its hinge-pin $b$, and the stair-rod is slipped into its place, and the hook again shut down upon the catch. It will resist any pressure.

The advantages of this fastening are perceived by comparing it with those devices already used and known. The most common article known to the public is that which consists of a mere metallic strap of the length to cover the width of the stair-rod, and with nail or screw-hole in each end, generally made of brass, and stretched over or across the stair-rod, and screwed down or nailed at each end into the upright part of the stairs, and rod slides into them. This fastening requires a screw-driver, screws, or nails, and a tolerably good workman. If nails are used, a hammer is indispensable. In nine cases out of ten this labor is left in the hands of the servant-girl, and almost always done badly.

The apparatus proposed is of the simplest construction, and requires not any tools ordinarily to put it up. It presents in itself its own recommendation, and when once introduced would not be abandoned for other devices. It is equally adapted to round, curved, or flat rods.

Having stated the nature of the invention, and the mode of constructing and using the same, what I claim as my invention, and desire to secure by Letters Patent, is—

The combination of the stationary framework A, movable arm B, and hook $h$, substantially in the manner and for the purpose set forth.

WM. R. ANDERSON.

Witnesses:
L. D. GALE,
E. G. GALE.